United States Patent [19]
Kotani

[11] 3,916,256
[45] Oct. 28, 1975

[54] PROTECTIVE CIRCUIT IN A TEMPERATURE REGULATOR FOR THE THERMAL FIXING DEVICE OF A DUPLICATOR

[75] Inventor: Masakazu Kotani, Ebina, Japan
[73] Assignee: Fuji Xerox Co., Ltd., Tokyo, Japan
[22] Filed: Feb. 7, 1974
[21] Appl. No.: 440,490

[52] U.S. Cl. ......... 317/9 R; 219/216; 317/148.5 B; 317/DIG. 1
[51] Int. Cl.² ......................................... H02H 3/00
[58] Field of Search ............ 317/18 B, 40 R, 9, 41, 317/148.5 B, 31, 133.5; 219/216, 481, 482, 494, 507, 509; 340/214, 228 R, 256; 324/51

[56] References Cited
UNITED STATES PATENTS

| 3,225,268 | 12/1965 | Metzadour | 317/133.5 |
| 3,508,232 | 4/1970 | Williams et al. | 340/228 R |
| 3,588,614 | 6/1971 | Heidenreich et al. | 317/41 |
| 3,725,639 | 4/1973 | Seil et al. | 219/216 |

*Primary Examiner*—J. D. Miller
*Assistant Examiner*—Harry E. Moose, Jr.
*Attorney, Agent, or Firm*—Gerald J. Ferguson, Jr.; Joseph J. Baker

[57] ABSTRACT

Circuitry in a temperature regulator for the thermal fixing device of a duplicator comprising a source of electric power, a heater in the thermal fixing device supplied from the electric power source, a first controllable current regulating element responsive to a first control signal for regulating the current from the electric power source to the heater, a temperature detecting terminal directly connected to the heater for detecting the temperature thereof and providing a second control signal indicative of the temperature, a temperature regulator responsive to the second control signal for generating the first control to maintain the temperature of the heater at a substantially constant level, protective circuitry responsive to the substantial reduction of the second control signal for disconnecting the heater from the electric power source whereby if the temperature detecting terminal becomes disconnected from the heater, overheating of the heater is prevented.

2 Claims, 3 Drawing Figures

FIG. 1
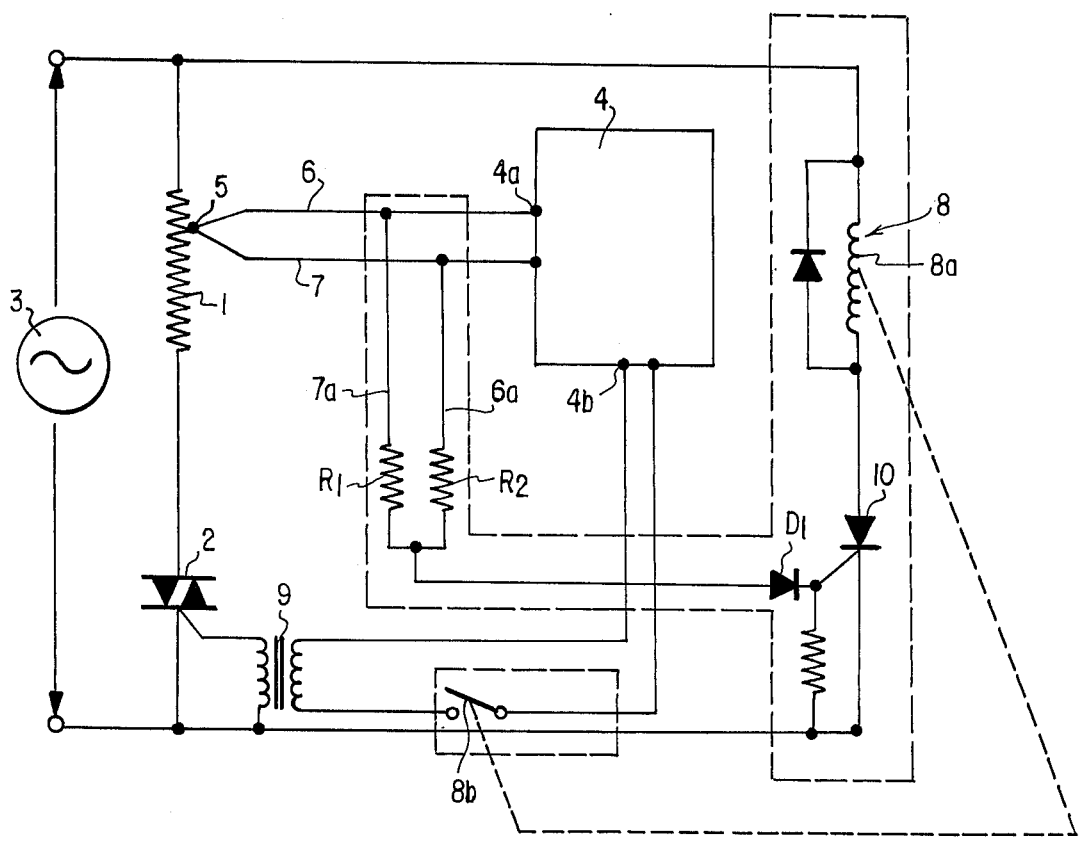
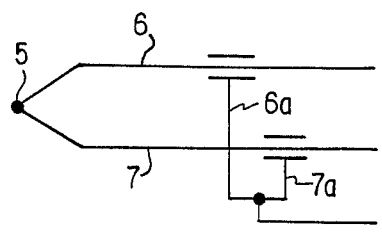
FIG. 2
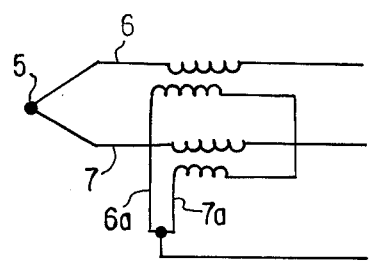
FIG. 3

PROTECTIVE CIRCUIT IN A TEMPERATURE REGULATOR FOR THE THERMAL FIXING DEVICE OF A DUPLICATOR

BACKGROUND OF THE INVENTION

1. Field of the Invention

The present invention relates to a protective circuit in a temperature regulator for the thermal fixing device of a duplicator.

2. Discussion of the Prior Art

A conventional duplicator has a thermal fixing device for fixing a toner image on copy paper, and the thermal fixing device has a temperature regulator for maintaining the temperature of the heater at a substantially constant level. The temperature detecting terminal of the temperature regulator is positioned directly on the heater to measure the temperature of the heater. However, if the temperature detecting terminal should be disconnected from the heater, a lower temperature than the actual level is detected, thus making it impossible to maintain the temperature of the heater at a substantially constant level. Further, in some instances, the heater may be overheated, which, in turn, may result in the copy paper being scorched or even accidentally burned.

SUMMARY OF THE INVENTION

The present invention is directed to the above described situation and a primary purpose thereof is the provision of a protective circuit in the thermal fixing device of a duplicator which is capable of automatically suspending the supply of electric power to the heater if the temperature detecting terminal of the temperature regulator should be disconnected from the heater whereby prevention of a fire hazard is effected before it can occur.

Other objects and advantages of this invention will become apparent upon reading the appended claims in conjunction with the following detailed description and the attached drawing.

BRIEF DESCRIPTION OF THE DRAWING

FIG. 1 is a circuit diagram of an illustrative embodiment of the invention.

FIGS. 2 and 3 are circuit diagrams of illustrative embodiments of partial modifications of the embodiment of FIG. 1.

DETAILED DESCRIPTION OF PREFERRED EMBODIMENTS

A detailed description of an illustrative embodiment of the present invention is given below by making reference to the drawing attached hereto. In the drawing, a heater 1 is positioned in the thermal fixing device of an electrophotographic duplicator which is not shown in the drawing. Heater 1 has a bidirectional thyristor 2 connected in series therewith, and both ends thereof have alternating-current electric power applied thereto from a power source 3. The heater 1 has a temperature detecting terminal 5 of a temperature regulator 4 directly connected therewith. The temperature detecting terminal 5 comprises a thermocouple, for example, and a temperature signal detected by this temperature detecting terminal 5 is transmitted to an input terminal 4a of the temperature regulator 4 through lead wires 6 and 7. Branch wires 6a and 7a are respectively connected to lead wires 7 and 6. Branch wires 6a and 7a are connected to one another through resistors $R_1$ and $R_2$, the connection point between $R_1$ and $R_2$ being connected to the gate of a thyristor 10 through a diode $D_1$. The thyristor 10 is connected in series with an excitation coil 8a of a relay 8 and has the alternating-current electric power from power source 3 applied thereto. The contact 8b of the relay 8 is interposed between output terminal 4b of the temperature regulator 4 and the primary side of a pulse transformer 9. The secondary side of pulse transformer 9 is connected to the gate of bidirectional thyristor 2.

In operation, the temperature detecting terminal 5 is connected to the heater 1 in a normal manner and a portion of the electric current between the temperature detecting terminal 5 and the temperature regulator 4 is applied to the gate of thyristor 10 from branch wires 6a and 7a through the resistors $R_1$ and $R_2$ and diode $D_1$. The thyristor 10 is thus ignited, to supply an electric current to the excitation coil 8a of relay 8. The contact 8b of relay 8 is thus closed and the output signal from the temperature regulator 4 is applied to the gate of bidirectional thyristor 2 through relay contact 8b and pulse transformer 9 to thus control the electric current to heater 1, the temperature of heater 1 thus being properly maintained at a substantially constant level at all time. In case the temperature detecting terminal 5 should be disconnected from heater 1, the electric current between the temperature detecting terminal 5 and the temperature regulator 4 is either interrupted or reduced in amperage. Therefore, the gate of thyristor 10 has no electric current supplied thereto whereby relay 8 is opened. The control signal applied to bidirectional thyristor 2 from temperature regulator 4 is thus interrupted, and electric power supply from source 3 to heater 1 is suspended as well. The temperature of heater 1 is thus dropped so that a fire hazard, as well as scorching of the copy paper, is prevented before such can occur.

In the FIG. 1 embodiment a portion of the signal detected by temperature detecting terminal 5 is directly tapped through resistors $R_1$ and $R_2$; however, the signal may be tapped in an indirect manner as shown in FIGS. 2 and 3.

The present invention is thus designed to automatically suspend electric power supply to the heater 1 in case temperature detecting terminal 5 should be disconnected from the heater, as set forth in detail above, so that any possibility of overheating the heater and thus scorching the copy paper or producing a fire hazard can be prevented before such a possibility occurs.

Numerous modifications of the invention will become apparent to one of ordinary skill in the art upon reading the foregoing disclosure. During such a reading it will be evident that this invention provides a unique protective circuit for accomplishing the objects and advantages hereinstated.

What is claimed is:

1. Circuitry in a temperature regulator for the thermal fixing device of a duplicator comprising:
    a source of electric power;
    a heater in said thermal fixing device supplied from said electric power source;
    a first controllable current regulating element responsive to a first control signal for regulating the current from said electric power source to said heater;

a temperature detecting terminal electrically connected to said heater for detecting the temperature thereof and providing a second control signal indicative of said temperature;

a temperature regulator responsive to said second control signal for generating said first control to maintain the temperature of said heater at a substantially constant level;

protective circuitry responsive to the physical disconnection of said temperature detecting terminal from said heater for disconnecting said heater from said electric power source whereby if said temperature detecting terminal becomes disconnected from said heater, overheating of said heater is prevented.

2. Circuitry as in claim 1 where said protective circuitry includes a second controllable current regulating element responsive to said physical disconnection of said temperature detecting terminal from said heater; and a controllable switch responsive to said second controllable current regulating element sensing said physical disconnection for disconnecting said temperature regulator from said first controllable current regulating element.

* * * * *